US007408101B2

(12) United States Patent
Shelton

(10) Patent No.: US 7,408,101 B2
(45) Date of Patent: Aug. 5, 2008

(54) MUSICAL INSTRUMENT STRINGS AND A METHOD OF INSTRUCTION

(76) Inventor: Rodney D. Shelton, 709 Williamsburg Dr., Smyrna, TN (US) 37167

( * ) Notice: Subject to any disclaimer, the term of this patent is extended or adjusted under 35 U.S.C. 154(b) by 13 days.

(21) Appl. No.: 11/269,709

(22) Filed: Nov. 9, 2005

(65) Prior Publication Data

US 2006/0101979 A1 May 18, 2006

Related U.S. Application Data

(60) Provisional application No. 60/626,974, filed on Nov. 12, 2004.

(51) Int. Cl.
*G09B 15/00* (2006.01)

(52) U.S. Cl. .................................... 84/297 S; 84/470 R

(58) Field of Classification Search ............... 84/470 R, 84/477 R, 471 R, 472, 485 R, 297 R, 297 S, 84/476
See application file for complete search history.

(56) References Cited

U.S. PATENT DOCUMENTS 3,218,904 A 11/1965 Hartman
3,771,409 A 11/1973 Rickey
3,820,434 A * 6/1974 Roberts .................... 84/485 R
3,845,686 A 11/1974 Salvo
3,978,756 A * 9/1976 Feldman ................... 84/470 R
4,291,606 A 9/1981 Lepage
4,559,861 A 12/1985 Patty et al.
4,712,464 A 12/1987 Nance
4,791,848 A 12/1988 Blum, Jr.
5,458,040 A 10/1995 Lawrence, Jr.
D410,671 S 6/1999 Aleksa
5,920,023 A * 7/1999 Ravagni et al. ........... 84/485 R
6,452,080 B1 9/2002 Coonce
2004/0099124 A1 5/2004 Deverich

FOREIGN PATENT DOCUMENTS

FR 2 648 258 A1 12/1990
JP 5-46069 2/1993

OTHER PUBLICATIONS http://www.dontfret.com, Don't fret Productions; (6 pages) printed Sep. 23, 2004.
http://users2.ev1.net/~smyth/linernotes/articles/GutarPlyr10-68/GutarPlyr10-68.htm, Dave Guard's Colour Guitar; (3 pages) printed Sep. 23, 2004.

* cited by examiner

*Primary Examiner*—Kimberly R Lockett
(74) *Attorney, Agent, or Firm*—Richard C. Litman

(57) ABSTRACT

The musical instrument strings and a method of instruction comprise a set of strings, each string having colored markings along its length, each mark indicating a note sounded when the string is played at the mark. Additional notes are similarly marked along each string, each of the musical notes having a unique color. Additional markings along the neck of the instrument and at open string positions correspond to the colored markings of the strings. Music notation having colored notes corresponding to the colored markings of the string facilitates a student in learning to play a musical instrument by matching the colored notes to the colored markings on the strings.

15 Claims, 5 Drawing Sheets

MUSICAL INSTRUMENT STRINGS AND A METHOD OF INSTRUCTION

CROSS-REFERENCE TO RELATED APPLICATION

This application claims the benefit of U.S. Provisional Patent Application Ser. No. 60/626,974, filed Nov. 12, 2004.

BACKGROUND OF THE INVENTION

1. Field of the Invention

The present invention relates to musical instruments of the type having a neck and a fingerboard or fret board and, more particularly, to musical instrument strings and a method of instruction utilizing colored markings disposed on the musical instrument strings to identify fingering positions.

2. Description of the Related Art

Students of stringed musical instruments, such as the guitar, bass guitar, banjo, violin, cello, and numerous other types of stringed instrument of the general type having a neck and a plurality of strings extending along the neck, are faced with difficulty in learning to play the instrument. Such instruments are generally played by using the fingers of one hand to press the strings against a fingerboard or a fret board, thereby producing different notes depending on the fingering position along the strings. Much of the difficulty in learning to play this type of instrument is in learning which finger positions are to be used to play which notes. Compounding this difficulty is the challenge of learning to read printed music, and to identify the notes of the printed music to be played.

Various training devices and methods have been devised to help students in learning to play stringed instruments. However, often a specialized training instrument is employed, or a specialized attachment for the instrument required, or a separate guide, such as a fingering chart. Such a device as a fingering chart, while helpful, doesn't direct a player's fingers to a specific fingering location on the stringed instrument. Attachments for placement on the neck of the instrument have been used to indicate fingering positions for various chords. Such attachments, however, may not be universal in their application, and are prone to difficulty in attachment to an instrument and may be prone to causing cosmetic damage to the instrument. Specialized instruments, such as a guitar having a plurality of lights, such as LEDs, embedded in the fret board for indicating fingering positions, may be costly and may teach the student to become reliant on the particular training instrument, rather than facilitating the student's growth into other instruments.

A method for teaching a student to correlate musical notes to the fingering positions on a stringed musical instrument that does not require a specialized instrument (or an attachment to the instrument, or a separate device for guidance) leaves the student free to learn on an instrument of his choice and carry the technique and skills from one instrument to another. Thus, musical instrument strings and a method of instruction solving the aforementioned problems are desired.

SUMMARY OF THE INVENTION

The musical instrument string and method of instruction provide an aid in teaching and learning of a stringed musical instrument, such as a guitar. The teaching strings comprise a set of strings for a musical instrument, wherein each of the strings has colored markings along its length to indicate a note that is played on the string at each marked position. In a four-string bass guitar, for example, a string set includes E, A, D, and G strings. The E string plays an E note when open. Playing the E string fingered at the first fret position, an F note is played. Thus, a color marking corresponding with the note F is disposed along the E string at the fingering position for the F note at the first fret. Similarly, playing the E string fingered at the third fret produces a G note. A second color marking, now corresponding to the G note, is disposed along the E string at the fingering position for the G note at the third fret. It can be recognized that, at subsequent positions along the E string, and at appropriate positions on the A, D, and G strings, color markings may be similarly applied.

With a set of teaching strings so marked, a stringed instrument student can easily identify notes along the instrument's fingerboard by color. Similarly, a music teacher can readily direct a student to particular notes and fingerings along the instrument's fingerboard.

In addition to color markings on the strings, according to the method of instruction of the present invention a musical stringed instrument also includes color-coded open position markings on the fingerboard of the musical stringed instrument, and color-coded instrument neck markings along the side of the neck of the musical stringed instrument. These markings correspond in color to the color-coded markings on the strings of the instrument.

In addition to the colored markings on the strings, sheet music may use colored notes matching the colored markings on the strings. Thus, if G notes are marked on the teaching strings in red, G notes are printed in red on the sheet music. With sheet music employing colored notes that match the markings on the teaching strings, a student can easily and visually relate the notes on the sheet music to the fingering positions to be used to play a tune on the musical instrument.

The method of instruction for musical stringed instruments provides for coloring a string with color coded markings identifying a musical note when the string is installed on a neck of an instrument, and producing music notation including color-coded notes that match the color-coded markings of the strings. Installation of the above-mentioned color-coded open position markings and the color-coded neck markings on the musical stringed instrument further aid in the instruction of musical stringed instruments.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
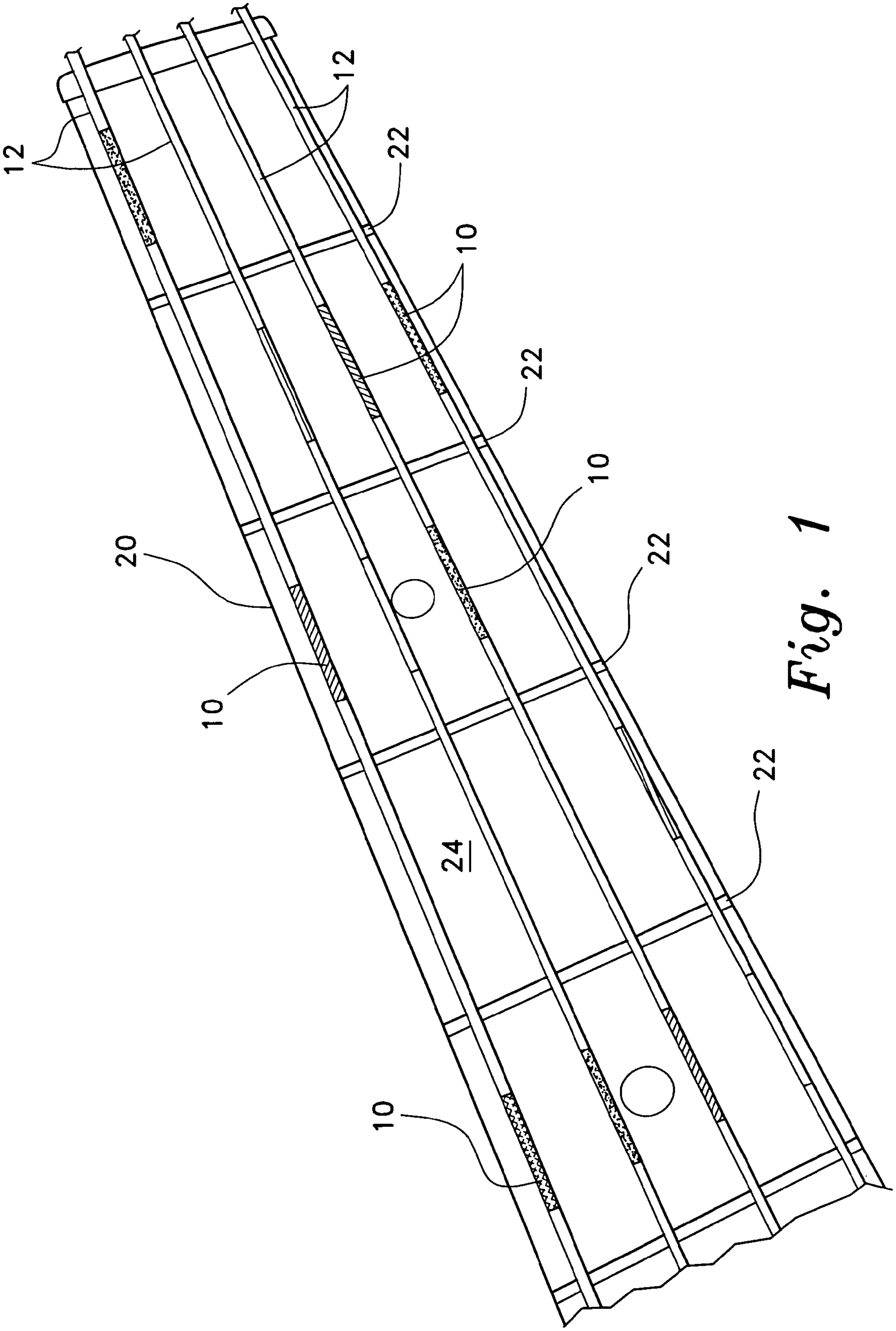
FIG. 1 is an environmental, perspective view of musical instrument strings according to the present invention.

The present invention comprises musical instrument strings and a method of instruction using the musical instrument strings to teach and to learn how to play a stringed musical instrument. Referring to FIG. 1, musical instrument strings 12 are shown on the neck 20 of a fretted musical instrument. In the illustrated embodiments, a fretted bass guitar is shown as an example. It will be recognized that the musical instrument strings 12 according to the present invention can be applied to any similar stringed musical instrument of the type comprising an extended neck and having a plurality of strings stretched along a face or fingerboard 24 of the neck, including both fretted instruments, as shown, and unfretted instruments. On a fretted instrument, a plurality of frets 22 are disposed along the instrument's neck, each of the frets demarking a particular fingering position. The strings are generally depressed by a player's fingers slightly above each fret 22.

The musical instrument strings 12 are generally conventional strings of any type suited for the various types of stringed musical instruments. Colored markings 10 are disposed along the length of the strings to indicate fingering positions for the different notes along the strings (it will be obvious to those skilled in the art that the same note on different strings may have a different pitch, being in a different octave). In the instant embodiment, the colored markings 10 identify the major notes A, B, C, D, E, F, and G along each of the musical instrument strings 12. A unique color is assigned to each of the notes as follows in Table 1:

TABLE 1

| Note to Color Mapping | |
|---|---|
| A | Yellow |
| B | Blue |
| C | White |
| D | Black |
| E | Brown |
| F | Red |
| G | Green |

It can be appreciated that alternate color assignments may be used, including different colors than those shown herein, as well as color patterns, such as striped or other patterns, employing one or more colors for each of the markings.

Additionally, the intervals between the notes A, B, C, D, E, F and G may be color-coded as well. These intervals are the notes A♯/B♭, C♯/D♭, D♯/E♭, F♯/G♭, and G♯/A♭ (the notation A♯/B♭ refers to a note that may be called either by its sharp designation (A♯), or by its flat designation (B♭).

Figure 2:
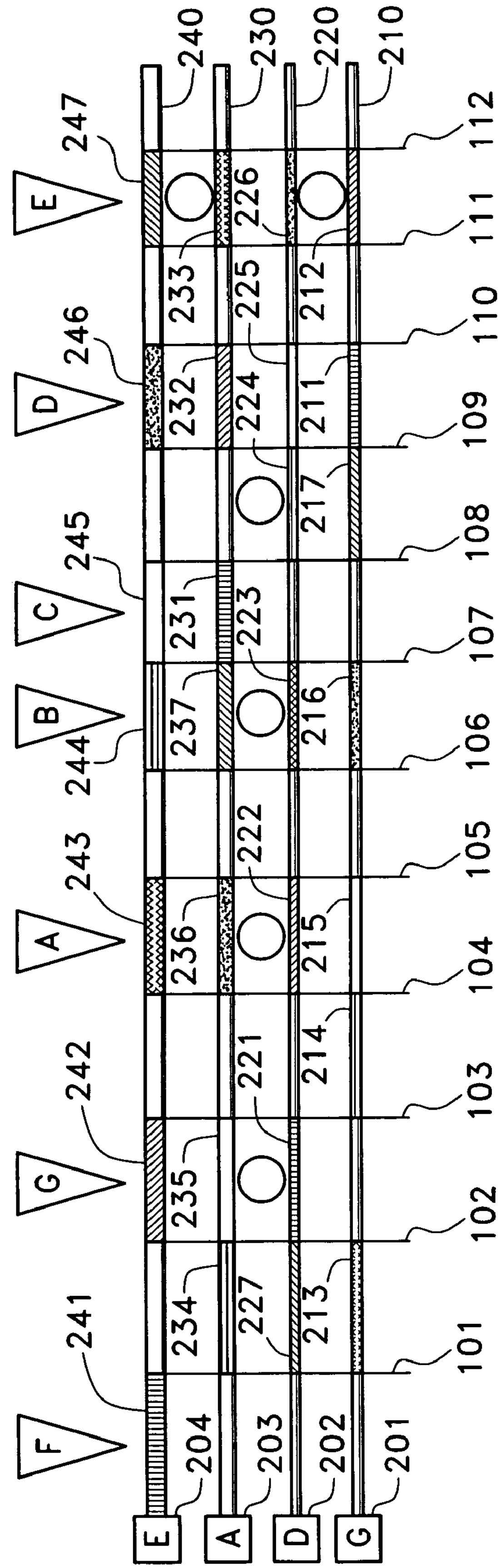
FIG. 2 is a diagrammatic view of an embodiment of the musical instrument strings for a four-string bass guitar.

Turning now to FIG. 2, musical instrument strings 12 are shown for a four-string bass guitar, including an E string 240, an A string 230, a D string 220, and a G string 210. An arrangement of the colored markings 10 is shown for the four string bass guitar strings 240, 230, 220, and 210. Each of the strings 210, 220, 230, and 240 is marked with colored markings to indicate the major notes A, B, C, D, E, F, and G. Thus, the E string 240 has a mark 241 at the first fingering position, above the first fret 101, in red to indicate that an F note will be sounded when the E string 240 is played while fingered in this position. A mark 242 in green, disposed on the E string 240 at the third fingering position, above the third fret 103, indicates a G note. A mark 243 in yellow, disposed on the E string 240 at a fingering position above the fifth fret 105, indicates an A note. A mark 244 in blue, disposed on the E 240 string at a fingering position above the seventh fret 107, indicates a B note. A mark 245 in white, disposed on the E string 240 at a fingering position above the eighth fret 108, indicates a C note. A mark 246 in black, disposed on the E string 240 at a fingering position above the tenth fret 110, indicates a D note. Finally, a mark 247 in brown, disposed on the E string 240 at a fingering position above the twelfth fret 112, indicates an E note. The colored markings repeat in order for additional notes along the E string.

The positions and colors for markings for a complete set of musical instrument strings 12 for a four-string bass are shown as follows in Table 2:

TABLE 2

Color Marking Positions for 4-string Bass

| | E STRING | A STRING | D STRING | G STRING |
|---|---|---|---|---|
| 1 | F 241 | | | |
| 2 | | B 234 | E 227 | A 213 |
| 3 | G 242 | C 235 | F 221 | |
| 4 | | | | B 214 |
| 5 | A 243 | D 236 | G 222 | C 215 |
| 6 | | | | |
| 7 | B 244 | E 237 | A 223 | D 216 |
| 8 | C 245 | F 231 | | |
| 9 | | | B 224 | E 217 |
| 10 | D 246 | G 232 | C 225 | F 211 |
| 11 | | | | |
| 12 | E 247 | A 233 | D 226 | G 212 |

Figure 3:
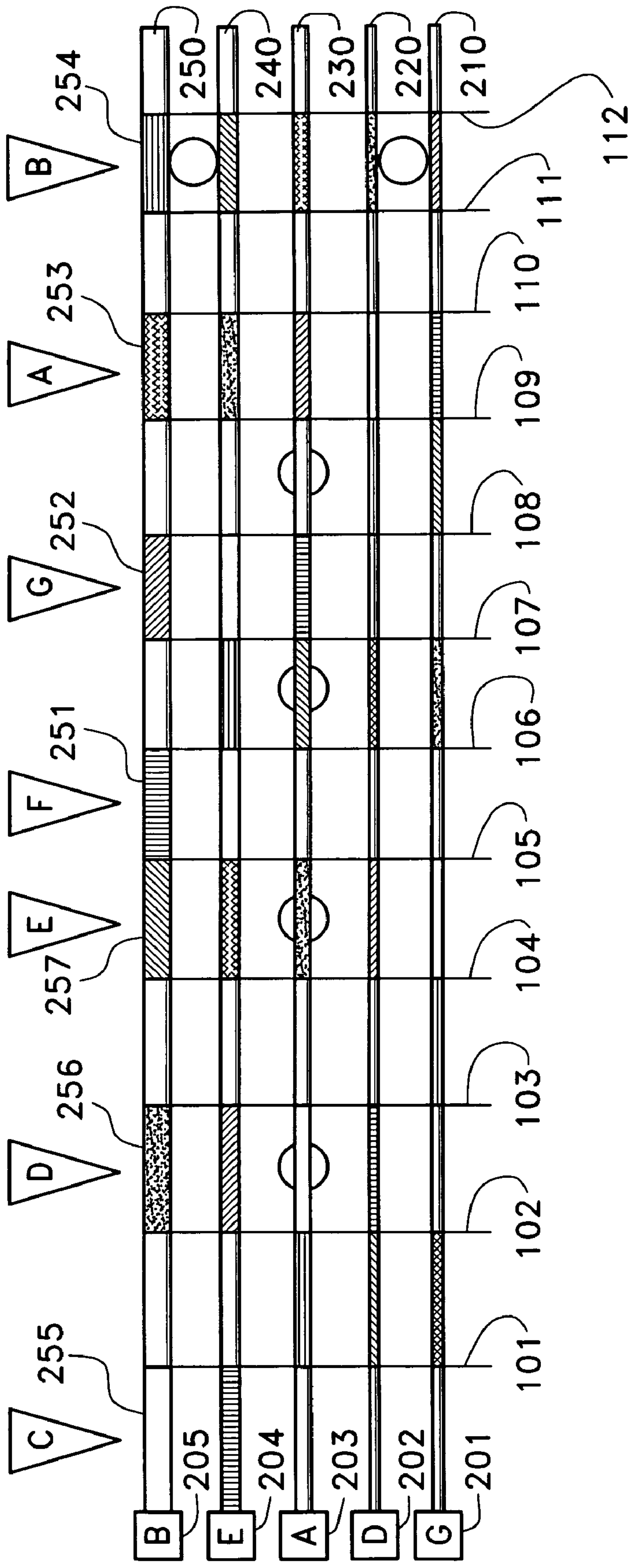
FIG. 3 is a diagrammatic view of an embodiment of the musical instrument strings for a five-string bass guitar.

Similarly, the positions and colors for markings for a complete set of musical instrument strings 12 for a five-string bass, as illustrated in FIG. 3, having a B string 250, an E string 240, a G string 230, a D string 220, and a G string 210, are shown as follows in Table 3:

TABLE 3

Color Marking Positions for 5-string Bass

| | B STRING 250 | E STRING 240 | A STRING 230 | D STRING 220 | G STRING 210 |
|---|---|---|---|---|---|
| 1 | C 255 | F 241 | | | |
| 2 | | | B 234 | E 227 | A 213 |
| 3 | D 256 | G 242 | C 235 | F 221 | |
| 4 | | | | | B 214 |
| 5 | E 257 | A 243 | D 236 | G 222 | C 215 |
| 6 | F 251 | | | | |
| 7 | | B 244 | E 237 | A 223 | D 216 |
| 8 | C 252 | C 245 | F 231 | | |
| 9 | | | | B 224 | E 217 |
| 10 | A 253 | D 246 | G 232 | C 225 | F 211 |
| 11 | | | | | |
| 12 | B 254 | E 247 | A 233 | D 226 | G 212 |

In addition to the colored markings on the strings, color-coded marking indicia may be applied to the neck 20 of the instrument itself. In FIGS. 2 and 3, marking indicia or labels 201, 202, 203, 204, and 205 identify each of the strings 210, 220, 230, 240, 250, indicating the note of each string 210, 220, 230, 240, 250 when played open. These are color-coded open position letter markings, identifying each string by the letter of its open note, so that label 201 identifies the G string 210, label 202 the D 220 string, label 203 the A string 230, label 204 the E label 240, and label 205 the B string 250. In addition to the letter marking, the labels 201, 202, 203, 204, and 205 may be color-coded, using the same color scheme as the musical instrument strings 12.

Figure 4:
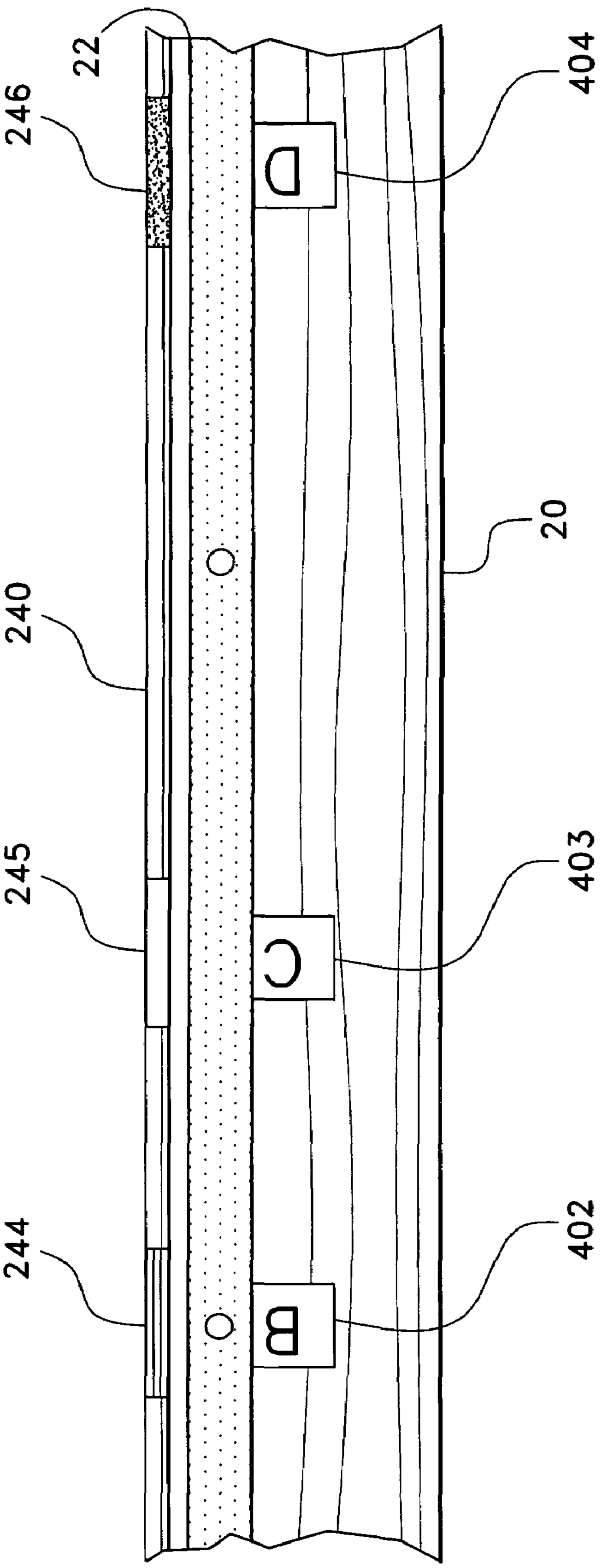
FIG. 4 is a partial side view of the neck of a stringed instrument, showing markings along the neck in association with colored markings of the musical instrument strings according to the present invention.

Additionally, referring to FIG. 4, marking indicia or labels, such as labels 402, 403, and 404 may be located along the side of the instrument's neck 20, on or adjacent to the fingerboard 24, to identify particular notes of interest. FIG. 4 shows the neck 20 of a four-string bass having an E string 240 located along the edge of the neck 20. The markings 402, 403, and 404 identify notes B, C, and D along the E string, and are aligned with the colored markings 244, 245, and 246 identifying the same notes. The labels 402, 403, and 404 may be color-coded, using the same color scheme as the strings.

Figure 5:
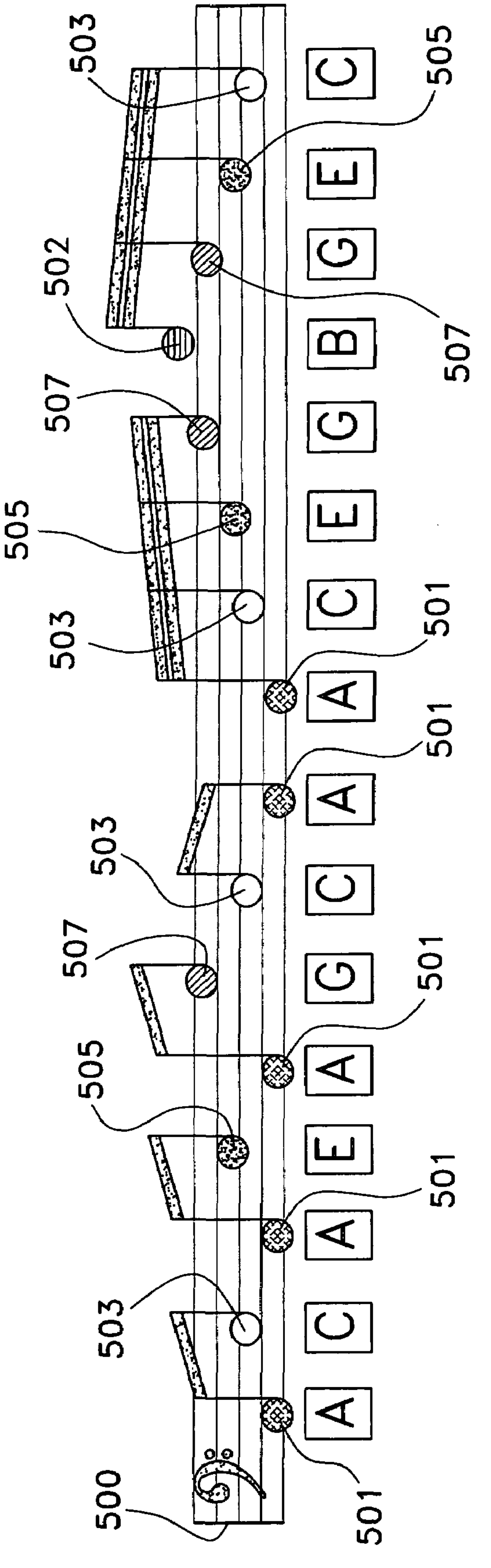
FIG. 5 shows an exemplary sheet music musical notation of a musical passage using a color-coded notation corresponding to the color markings on the musical instrument strings according to the present invention.

Referring now to FIG. 5, an exemplary sheet music musical notation is shown using a color-coded notation matching the color to note mappings of the musical instrument strings 12. Notes 501, 502, 503, 505, and 507 on a musical clef 500 are colored so that, in addition to their position on the musical clef, their colors indicate the pitches they represent. Additionally, the colors match the color note mappings on the musical instrument strings 12 so that a tune may be played by simply matching the colors. Thus, reading music becomes simply the task of matching the colored notes of the musical notation to the colored markings 10 on the musical instrument strings 12. A student can readily learn to play a musical instrument by matching the colored notes to the colored markings 10 on the musical instrument strings 12.

It is to be understood that the present invention is not limited to the embodiments described above, but encompasses any and all embodiments within the scope of the following claims.

I claim:

1. A musical instrument string, comprising:

an elongated flexible member forming a string;

a plurality of uniquely color-coded markings disposed along the length of the string, each of the uniquely color-coded markings identifying a musical note sounded when the string is installed along a neck of a musical instrument and the string is fingered at a corresponding color-coded marking.

2. The musical instrument string according to claim 1, wherein said plurality of color-coded markings each identify musical notes A, B, C, D, B, F, and G.

3. The musical instrument string according to claim 1, wherein said plurality of color-coded markings each identify musical notes A♯/B♭, C♯/D♭, D♯/E♭, F♯/G♭, and G♯/A♭.

4. A system for learning to play a musical stringed instrument, comprising:

a musical instrument having a neck; and a plurality of elongated flexible members, each of the flexible members forming a string, the strings being mounted along the neck of the musical instrument, each of the strings having a plurality of uniquely color-coded markings along the length of the string, the uniquely color-coded markings identifying a musical note sounded when the string is fingered at a corresponding color-coded marking.

5. The system for learning to play a musical stringed instrument of claim 4, wherein said plurality of color-coded markings identify musical notes A, B, C, D, B, F, and G.

6. The system for learning to play a musical stringed instrument of claim 4, wherein said plurality of color-coded markings identify musical notes A♯/B♭, C♯/D♭, D♯/E♭, F♯/G♭, and G♯/A♭.

7. The system for learning to play a musical stringed instrument of claim 4, further comprising a color-coded open position letter marking disposed on the neck of said musical instrument adjacent a corresponding one of the strings, the color-coded open position letter marking identifying a specific musical note sounded when the corresponding string is played in an open position, the color-coded open position letter marking corresponding in color to the color-coded markings on the strings.

8. The system for learning to play a musical stringed instrument of claim 4, further comprising a color-coded instrument neck marking disposed along a side of the neck of said musical instrument, the neck marking identifying a specific musical note sounded when one of the strings is fingered at the corresponding color-coded instrument neck marking.

9. The system for learning to play a musical stringed instrument of claim 4, further comprising an article of sheet music having music notation including color-coded notes matching the plurality of color-coded markings on said strings identifying said musical notes.

10. A method of instruction for musical stringed instruments, comprising the steps of:

establishing a color scale matching colors with musical notes;

coloring a plurality of strings for the musical instrument with a plurality of uniquely color coded-markings along the length of the strings, each of said uniquely color-coded markings identifying the corresponding musical note on the color scale;

mounting the strings along a neck of the musical instrument; and fingering the strings at one of the uniquely color-coded markings in order to produce the corresponding musical note on the color scale.

11. The method of instruction for musical stringed instruments of claim 10, further comprising the step of producing sheet music notated to include color-coded notes matching the plurality of color coded markings according to the color scale.

12. The system for learning to play a musical stringed instrument of claim 10, wherein said plurality of color coded markings identify musical notes A, B, C, D, E, F, and G.

13. The system for learning to play a musical stringed instrument of claim 10, wherein said plurality of color coded markings identify musical notes A♯/B♭, C♯/D♭, D♯/E♭, F♯/G♭, and G♯/A♭.

14. The method of instruction for musical stringed instruments of claim 10, further including the step of applying a color-coded open position letter marking on the neck of the musical stringed instrument adjacent a corresponding one of the strings, each of the color-coded open position letter markings identifying a specific musical note sounded when the corresponding string is played in an open position, the color-coded open position letter markings corresponding in color to the plurality of color-coded markings on the strings.

15. The method of instruction for musical stringed instruments of claim 10, further including the step of applying a color-coded instrument neck marking along a side of the neck of the musical instrument, each of the neck markings identifying a specific musical note sounded when one of the strings is fingered at a corresponding color-coded instrument neck marking.

* * * * *